United States Patent [19]

Ljubomir

[11] Patent Number: 4,535,213
[45] Date of Patent: Aug. 13, 1985

[54] APPARATUS FOR WELDING IN VERTICAL, HORIZONTAL AND SLANTING POSITION

[76] Inventor: Srni Ljubomir, 41000 Zagreb, Vidikovac 18, Yugoslavia

[21] Appl. No.: 435,509

[22] Filed: Oct. 20, 1982

[51] Int. Cl.$^3$ ............................................. B23K 11/02
[52] U.S. Cl. ..................................... 219/57; 219/101; 219/161
[58] Field of Search ...................... 219/56, 57, 58, 101, 219/104, 161

[56] References Cited

U.S. PATENT DOCUMENTS

| | | | |
|---|---|---|---|
| 2,967,925 | 1/1961 | Rietsch | 219/101 |
| 3,624,345 | 11/1971 | Armstrong | 219/137 R |
| 3,694,613 | 9/1972 | Ballard et al. | 219/161 |
| 4,153,830 | 5/1979 | Baba et al. | 219/161 |

FOREIGN PATENT DOCUMENTS 34967 4/1980 Yugoslavia .

*Primary Examiner*—Roy N. Envall, Jr.
*Assistant Examiner*—Alfred S. Keve
*Attorney, Agent, or Firm*—Russell, Georges, Breneman, Hellwege & Yee

[57] ABSTRACT

A welding apparatus includes a mechanical hand assembly suspended from a support assembly rotatably mounted on a movable base. The hand assembly includes a first pair of mechanical hands connected to a hydraulic cylinder and a second mechanical hand coaxially movable relative to the first mechanical hand. Each mechanical hand functions as an electrode during welding, and comprises a movable gripping member pivoted relative to a fixed gripping member by a hydraulic actuator. The support assembly comprises an elongated, counterbalanced beam which is length-adjustable relative to a rotatable support pedestal mounted on a movable base, and may include a pulley and cable supporting the hand assembly to provide adjustment in the vertical position of the handling assembly. The hydraulic system includes controls to effect grasping by the mechanical hands of the elements to be welded and coaxial longitudinal movement of the hands to bring together the elements for joining. The apparatus is particularly suitable for welding reinforcing rods, one of which may be partially embedded and having a length protruding in any spatial orientation.

6 Claims, 5 Drawing Figures

APPARATUS FOR WELDING IN VERTICAL, HORIZONTAL AND SLANTING POSITION

BACKGROUND OF THE INVENTION

The present invention relates generally to a welding apparatus and relates particularly to such apparatus capable of welding in vertical, horizontal and slanting positions.

More particularly, an object of the invention is to provide an apparatus for welding steel bars and similar materials, especially bars forming metal reinforcing frameworks used in construction. This apparatus is used, for example, for welding to bars that are already partially embedded in concrete or otherwise fixed in position, with at least a free length of the bar protruding therefrom and accessible.

The welding of bars which form a metal framework, such as the framework formed of reinforcing bars used in reinforced concrete construction, is not usually done at the construction site, but in an improvised place near the site. Preformed metal frameworks also can be ordered from a producer and placed on site by lifting or holding equipment, such as a crane.

The vertical bars of a metal framework are usually handled by mutually overlapping the ends and joined by welding with an apparatus for electric arc welding or a device for autogenous welding. Consequently, there is a greater consumption of bars used in making the framework since the overlapping parts of the bars represent a useless loss of material. Also, a specific type of electrode must be used in welding overlapping bars, and this increases the cost of assemblying the metal framework. Further, it is difficult, for example, to join bars to partially-embedded bars by welding their ends. Thus, the ends of the bars to be joined were overlapped and then the ends welded.

Another patent from the Federal Republic of Germany, No. 2,357,602, demonstrates the method of butt welding of two pipes to which electric lines are connected. One end of each pipe is held by two half rings, and the adjacent ends of the pipes are separated. Butt welding is achieved by tightening on the apparatus to bring the pipe ends together.

While this procedure provides a simple technique for butt welding of pipes, the use of the holding rings does not provide for precise alignment of the pipe ends. This technique is preferrable for butt welding of horizontally-positioned pipes rather than for vertically-oriented ones.

Yugoslav Pat. No. 34,967, issued to the present applicant illustrates the construction of the transmitting device for butt welding of steel bars. The device consists of a body supporting two mechanical hands which firmly grasp the bars. Flexible electrical cables cooled by a liquid, are attached to the bars. The mechanical hand which grips the embedded bar is connected to a bushing (or cartridge case) fixed to the body and having inner vertical grooves. An axle is firmly fixed to the other mechanical hand which is used to hold the bar being welded to the embedded bar. The axle is connected by a joint and a clamp to a lever used for pulling on the axle and causing it to slide within the vertical grooves, toward the bushing. Thus, by pulling the lever via the clamp, the axle suporting the second mechanical hand is moved towards the first mechanical hand, to establish contact between the ends of the bars and to achieve butt welding.

Although this device provides good results, considerable physical effort is required of the user to secure the bars to the mechanical hands with the nuts and bolts, and consequently results in a loss of time. A crane must be used to support and move the device. The crane operator usually sits too high to perform the welding operation without help from the device operator.

SUMMARY OF THE INVENTION

The technical problem solved by this invention may be characterized as: how to automatically achieve direct, frontal (butt) welding of steel bars in a metal framework, with the bars oriented in any position in space and with the possibility that the bars have only a very limited free length for manipulation. This technical problem exists, for example, during continuation, or extension, of a metal reinforcing framework having bars that are partially builtin (embedded) and the extension bars are to be butt welded thereto in vertical positions.

This technical problem cannot properly be solved by existing constructional solutions. The present invention is an improvement to the applicant's device described in the aforesaid Yugoslav Pat. No. 34,967, and provides new constructional features and automatic control.

The foregoing technical problem is fully solved by the apparatus of the present invention which permits welding in vertical, horizontal and slanted positions. The apparatus includes a mechanical hand assembly freely positionable relative to the embedded bar and operable to firmly hold and position the bars for joining. A first mechanical hand is supported by a body coupled to a hydraulic cylinder. A second mechanical hand is slidably supported on the body of the first mechanical hand and is reciprocated by operation of the hydraulic cylinder to move the second hand relative to the first hand.

The first mechanical hand is designed to securely grasp the bar which is to be joined to the embedded bar held by the second mechanical hand. Each mechanical hand has a movable jaw element which is pivoted relative to a fixed jaw element by a hydraulic actuator or cylinder. The jaw elements are adjustable to accommodate different-size bars and are designed to function as the electrodes during welding.

The welding apparatus further includes a support assembly mounted on a movable base, with the mechanical hand assembly suspended from the support assembly. The support assembly is freely rotatable in a horizontal plane and has an extensible boom or beam from which the mechanical hand assembly may be suspended by a rope and pulley arrangement to provide vertical position adjustments. A hydraulic drive provides fluid to operate the hydraulic cylinders and a control system regulates the fluid to provide automatic as well as manual control during the welding operation. A transformer supplies electricity to the jaw elements for welding, and a pump circulates fluid to cool the high-capacity electric cables and the jaw elements.

Due to the degree of adjustability of the support assembly and the mechanical hand assembly, the apparatus permits the secure holding and the welding of bars of a metal framework placed in any position. The jaws are adjustable to accept bars having diameters up to 42 mm., and welding can be achieved with an embedded bar protruding only 10 cm.

The apparatus has a simple construction and is reliable in operation. It is not heavy, thus providing for easy handling and transport, even to inaccessible locations. The hydraulic control system provides an automatic mode for the proper positioning and movement of the bars for welding.

Butt welding and arc welding is possible with steel bars, as well as with other steel profiles, oriented in any position in space.

BRIEF DESCRIPTION OF THE DRAWINGS

The invention will be clearly explained with the help of the following figures.

DETAILED DESCRIPTION

Figure 1:
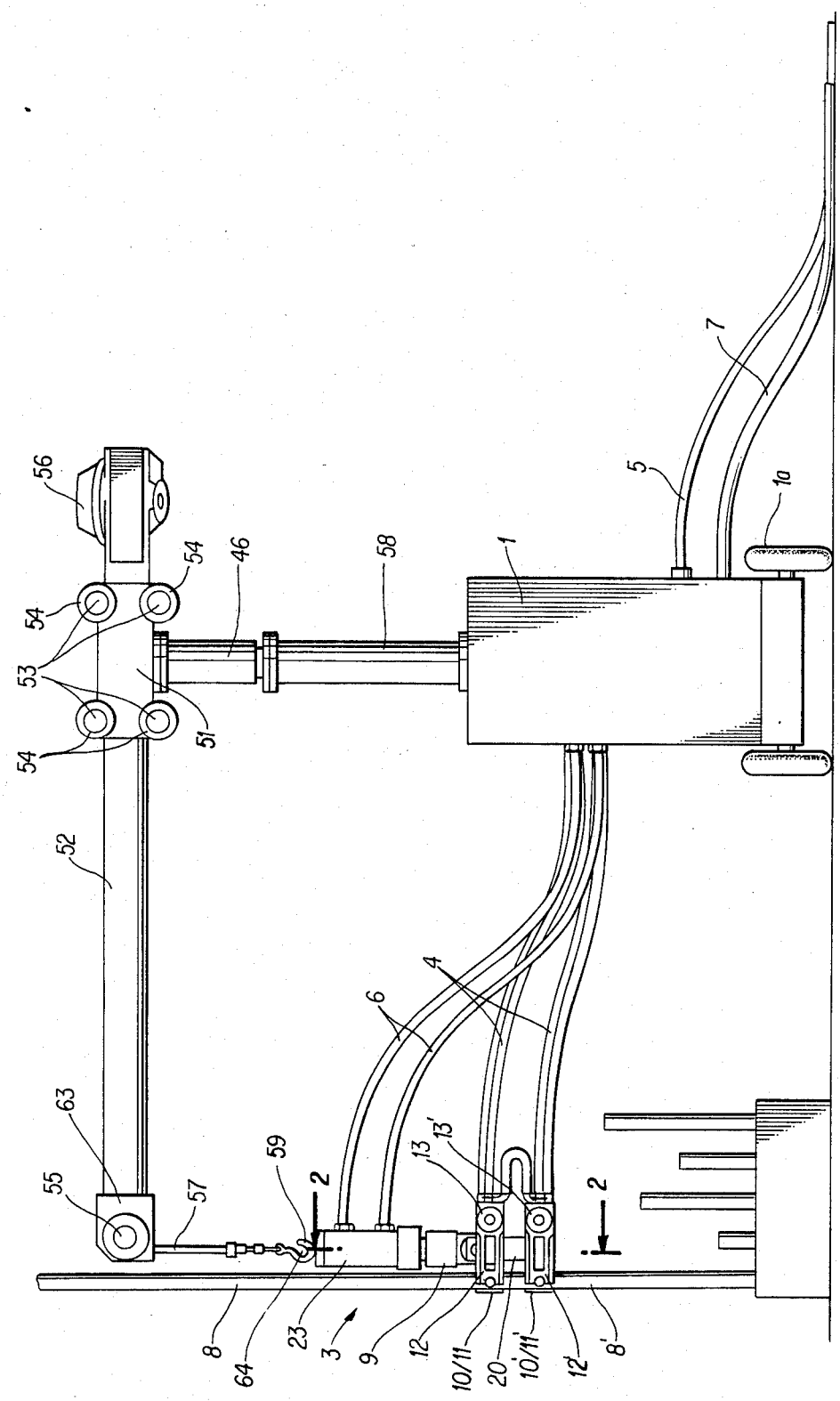
FIG. 1 shows schematically and in elevation the apparatus of the present invention.
Figure 2:
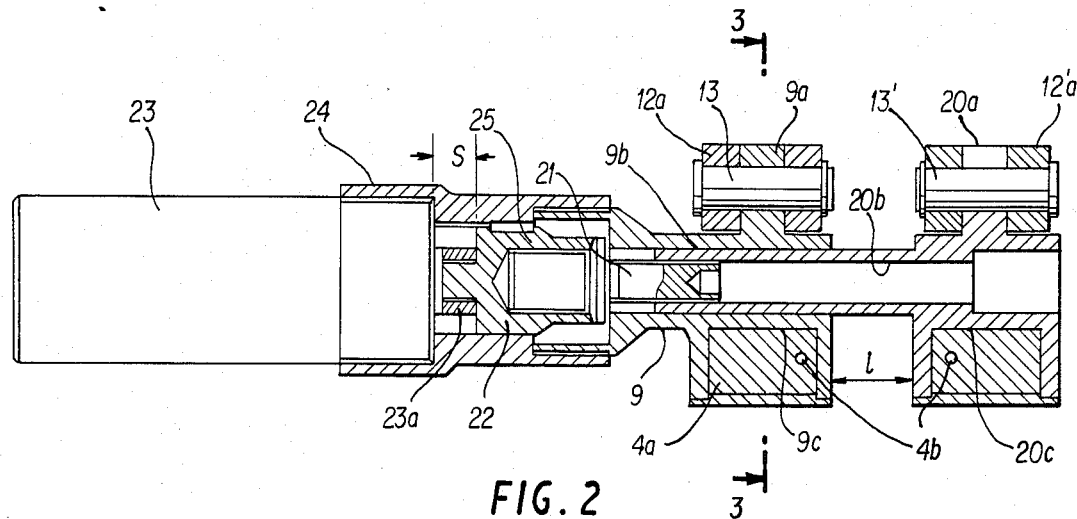
FIG. 2 is a view along line 2—2 in FIG. 1, partly in section and rotated for convenience.
Figure 3:
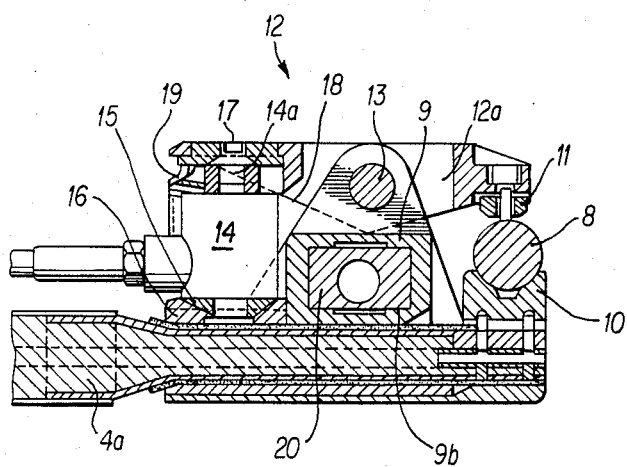
FIG. 3 is a view, partly in section, along line 3—3 in FIG. 2.

Referring to FIGS. 1-3 of the drawings, the apparatus of the present invention for welding in vertical, horizontal and slanting positions includes a support box or base 1 installed on wheels 1a for easy transport, a support assembly, denoted generally as 2, mounted on the base and a mechanical hand assembly, identified generally as 3, suspended from the support assembly. Disposed within base 1 and not shown are the equipment and controls for the operation of the apparatus, such as a water pump, electrical power transformer and a hydraulic system, as will be explained more fully below.

Water supply hose 5 is connected at one end to the water pump in base 1, with the other end adapted for connection to a water supply source. Electrical conductor or supply cable 7 is connected at one end to the transformer in base 1, and the other end is connectable to an electric distribution system or supply. Flexible cable 4 which is capable of carrying both electricity and water, leads from base 1 to mechanical hand assembly 3, and hydraulic lines 6 provide hydraulic fluid to the mechanical hand assembly from the hydraulic system in the base.

Mechanical hand assembly 3 includes two mechanical hands or grippers 12, 12', one disposed below the other as shown in FIG. 1. The lower mechanical hand 12' securely grasps a rod or bar 8' which is partially built-in or embedded in concrete, while the upper mechanical hand 12 securely grasps the lower end of a free bar 8 which is to be joined to bar 8'. Both mechanical hands 12, 12' are similar structurally and functionally, and the following description of mechanical hand 12 is also applicable to mechanical hand 12'.

Referring to FIGS. 2 and 3, mechanical hand 12 includes a tubular body 9 having a projection or ear 9a at one end to which the movable mechanical hand portion 12a is connected via axle or pivot 13 such that the mechanical hand portion 12a rotates about the pivot. Body 9 has a central tubular passage 9b of suitable cross-sectional configuration, preferably a square. One end of the electrical conductor 4a in cable 4 is received within a cutout or recess 9c located adjacent to projection 9a, while the other end is connected to fixed jaw element 10. Conductor 4a and jaw element 10 are separated from body 9 by electric insulation.

Thus, fixed jaw element 10, in addition to gripping bar 8, also serves as an electric contact for the welding of bars 8, 8', as described below. Movable jaw element 11 is securely fixed to one end of mechanical hand portion 12a and is electrically insulated therefrom. Jaw elements 10, 11 cooperate to grasp bar 8.

On body 9, over a ball washer 15 and a conical washer 16, is placed one end of a hydraulic cylinder 14. The end of the connecting rod 14a extending from cylinder 14, bears against the end of mechanical hand portion 12a opposite from movable jaw element 11, via a ball washer 17 and conical washer 18. Located under washer 18 is a reversible spring 19 which serves to return the connecting rod 14a, and thus to return the jaw element 11 to its initial position after releasing bar 8.

Mechanical hand 12' has a tubular body portion or slider 20 which is slidably received within the tubular passage 9b of body 9. Slider 20 has a central passage 20b of any cross-sectional configuration. The free end of slider 20 is provided with a projection or ear 20a to which movable mechanical hand portion 12a' is connected by a pivot 13' about which it rotates. Slider 20 has a cutout 20c in which is received one end of the other electrical conductor 4b used for welding. As with mechanical hand 12, the other end of conductor 4b is connected to the fixed jaw element 10' (not shown) of mechanical hand 12'. Conductor 4b and jaw 10' are separated by electrical insulation from slider 20, and as with jaw element 10, jaw element 10' cooperates to grasp the end of embedded bar 8' and provides the other electrical contact for the welding of bars 8, 8'.

While not specifically shown in the drawings, mechanical hand 12' is similar to the structure of mechanical hand 12 shown in FIG. 3, with the corresponding structural elements identified with a "prime" superscript. Thus, mechanical hand 12' would also include a movable jaw element cooperating with the fixed jaw element to grasp bar 8', and the movable mechanical hand portion 12' would be pivoted about axle 13' by a hydraulic cylinder 14'.

As shown in FIG. 2, the reciprocation of slider 20 within body 9 maintains an exact relationship of mechanical hand 12' relative to mechanical hand 12 and of the respective jaw elements on each mechanical hand, regardless of the angle, direction or orientation of the mechanical hand assembly 3. Thus, the axes of bars 8, 8' are constantly maintained coaxial to permit the exact joining of the ends thereof.

The other end of electrical conductors 4a, 4b are connected to the secondary coil of the transformer (not shown) in base 1. Each conductor 4a, 4b is composed of a layer or sheath of thin copper wires placed on an elastic base through which cooling water passes. In order to control heating of the conductors 4a, 4b during use due to the passage of high-intensity current, a constant flow of cooling water passes through the center of the conductors. At the same time, the water is circulated through the jaw elements of mechanical hands 12, 12' to cool them, after which the water is drained into a reservoir (not shown).

As shown in FIG. 2, the end of body 9 opposite mechanical hand 12 is threaded into one end of a tubular bushing or connector sleeve 24. One end of a hydraulic cylinder 23 is received in the other end of sleeve 24. Slidably disposed within sleeve 24 is a coupling 22 to one end of which is attached the connecting rod 23a of cylinder 23. Coupling 22 is secured against rotation by a wedge 25. Disposed within the central passage 20b of slider 20 is a bolt 21, the interior end of which is threadedly attached to the remaining end of coupling 22. Bolt 21 thus secures slider 20 and mechanical hand 12′ to coupling 22.

It can be seen that by turning bolt 21 one way or the other, it can be advanced into or out from coupling 22. Bolt 21 thus permits the synchronized adjustment of mechanical hands 12, 12′ to accommodate different diameters of bars to be welded, by permitting the adjustment of the distance L between adjacent sides of the jaw elements of the mechanical hands and the distance S of their approach during welding. Rotation of bolt 21, hence, permits the simultaneous increase or decrease in L and S. The increment of change of S corresponds to one rotation of bolt 21 and depends upon the pitch of the screw threads used to join bolt 21 to coupling 22. Regulation of the distances can be obtained by a convenient choice of thread pitch, dependent upon the diameters of the bars.

By way of example, if $L_{max}$ and $S_{max}$ represent measurements that correspond to the largest diameter of the bars that are to be welded, and $L_{min}$ and $S_{min}$ represent measurements that correspond to the smallest diameter of the bars, and if also H represents the pitch of the bolt's threads in the central passage 20b of slider 20, and h represents the pitch of the threads in coupling 22, then the relation:

$$\frac{H}{h} = \frac{L_{max} - L_{min}}{S_{max} - S_{min}}$$

For example, if the apparatus is used to weld two bars having diamters of 18 mm to 36 mm, and for 36 mm, $L_{max}=60$ mm, $S_{max}=25$ mm, while for 18 mm, $L_{min}=34$ mm and $S_{min}=12$ mm, then the above formula yields:

$$\frac{H}{h} = \frac{60 - 34}{25 - 12} = 2$$

This means that if the pitch (H) of the threads in passage 20b is 3, then it is necessary that the thread pitch (h) in coupling 22 be 1.5 mm.

As noted above, hydraulic cylinders 14, 14′ control the movement of the respective jaw elements 11, 11′ for grasping bars 8, 8′, and hydraulic cylinder 23 controls the movement of mechanical hand 12′ relative to mechanical hand 12 to position the adjoining ends of the bars 8, 8′. Cylinders 14, 14′ and 23 are supplied with oil under pressure by a hydraulic drive 26, disposed within a base 1 and schematically shown in FIG. 4.

Hydraulic drive 26 includes a pump 26a connected to a hydraulic fluid storage reservoir or accummulator 28 which compensates for oil losses due to leakage and, so, reduces frequent operation of the pump. An overflow or pressure relief valve 29 connected to accumulator 28 limits the maximum pressure in the system. Circuit breaker 27 disconnects hydraulic pump 26a when the necessary working pressure of the system is attained. Hydraulic lines extend from pump 26a to distributors 30, 30′, 33, 34, 35, 36 and 31.

Hydraulic cylinder 23 is connected by lines to distributors 33 and 34, to distributors 35 and 36, and to valve 38 used for fine adjustment. Cylinder 23 can be connected via distributor 32 to one side of hydraulic cylinder 39, with the other side of cylinder 39 constantly connected to hydraulic drive 26. The connecting rod 39a of cylinder 39 is about 2 mm. smaller in diameter than the connecting rod 23a of cylinder 23. The opening of distributors 32 and 33 operates cylinder 23 and 39 simultaneously and, because of these differences in the connecting rod diameters, connecting rod 23a in cylinder 23 is extended from the cylinder while the connecting rod 39a of cylinder 39 is retracted.

Connecting rod 39a bears upon a cam plate 42 via adjusting screw 40 and a slider-with-wheel 41. Coaxial with cam plate 42 is another plate 43 having a bump or lobe 43a, with the angular position between these plates being adjustable. Plates 42 and 43 are rotated slowly by a special motor with a speed reducer, or a gear box, which is not shown.

Overflow, or relief, valve 45 is connected to cylinder 39 to protect cam plate 42 and its bearing from overload should distributor 32 fail to stop while distributor 35 is opened.

Figure 5:
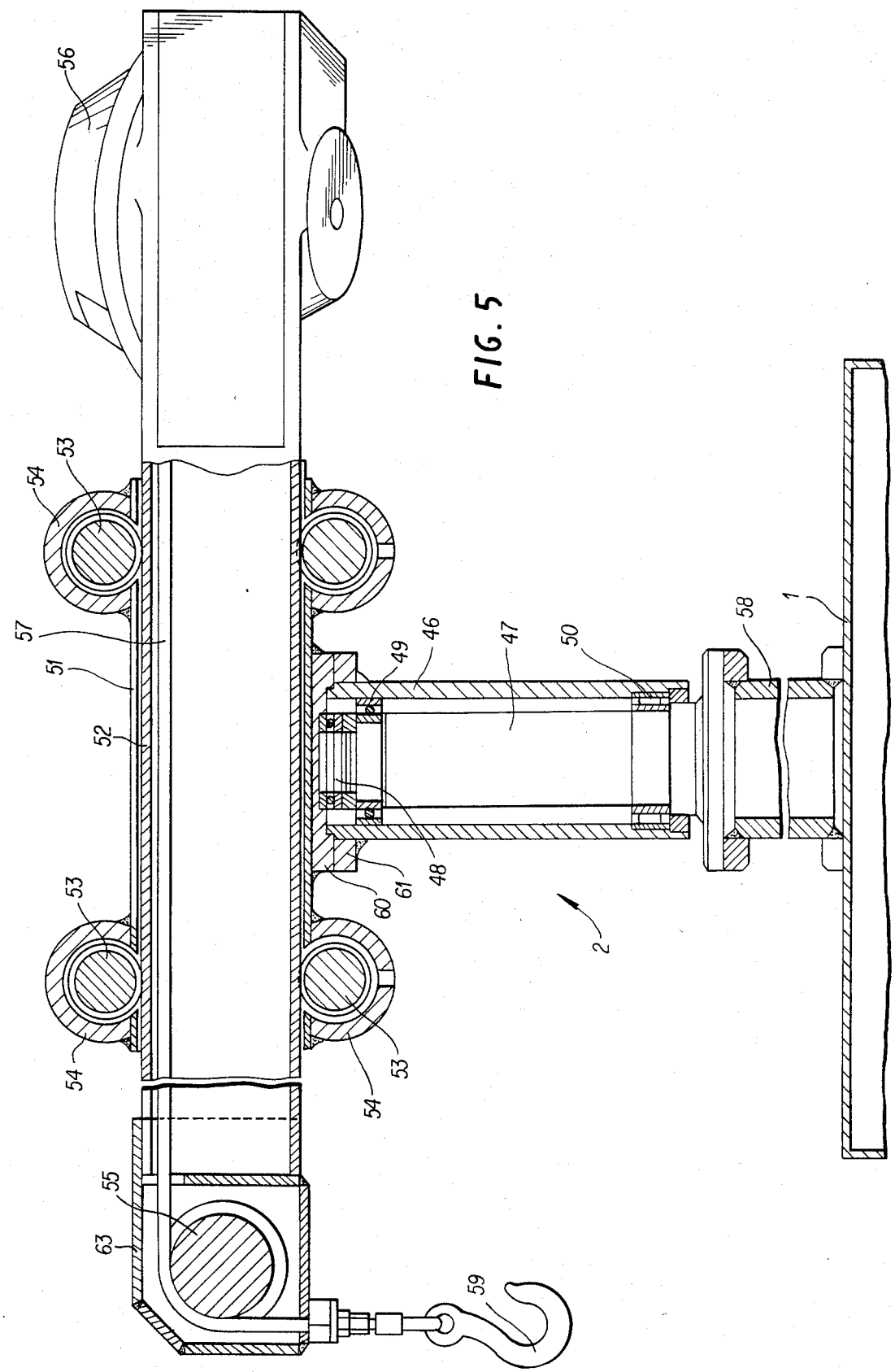
FIG. 5 is an elevational view, partly in section, of the support assembly of the apparatus.

The support assembly 2 shown in FIGS. 1 and 5 includes a support post 58, to which a second support post 47 is attached, fixed to the base 1. A tubular housing 46 is mounted at the lower end of support post 47 by bearings 50, and at the upper end of support post 47 by bearings 49 and 48, so that housing 46 rotates easily around post 47. Posts 58 and 47 can be fixed to the foundation instead of base 1.

An exterior flange 61 is fixed to the upper end of housing 46, and a hollow, tubular holder 51 horizontally is attached to flange 61 by a stand 60. Received within holder 51 is a tubular ladder (or beam) 52 bearing on rollers 53 disposed in upper and lower bearing assemblies 54 welded to the ends of holder 51. Beam 52 is easily moved over rollers 53 in the axial direction. Holder 51, with beam 52, can be rotated 360° in a horizontal plane due to the free rotation of housing 46 relative to the support post 47. At the same time, the beam 52 can be extended to the desired length from holder 51.

A balancer or counterweight 56 is attached to one end of beam 52 and a housing 63 containing a pulley 55 is fixed to the other end of the beam. A rope 57 (FIGS. 1 and 5) passes through the tubular beam 52 from the counterweight 56, over pulley 55, and extends from the housing 63. A hook 59 is attached to the free end of rope 57. The mechanical hand assembly 3 is suspended from hook 59 by a lug 64 secured to the end of hydraulic cylinder 23 (FIG. 1). Balancer or counterweight 56 neutralizes, or counteracts, the weight of the mechanical hand assembly 3 during movement of the apparatus. Hydraulic cylinder 23 may be suspended directy on beam 52, thus eliminating the need for rope 57 and pulley 55.

The operation of the welding apparatus of the present invention will now be explained. First, the apparatus is transported to the location where bars of a metal framework are to be welded. Then, supply hose 5 is connected to a source of water, and cable 7 is connected to a source of electricity. Mechanical hand assembly 3 is hung on hook 59. Mechanical hands 12, 12′ are placed in position near bars 8, 8′ to be welded by extending beam 52 and rotating holder 51. Then, adjustments are made for the diameters of the bars by turning bolt 21, as described above. Pressurized oil is provided to the hydraulic system by operation of hydraulic drive 26. Distributors 30, 30′ control cylinders 14, 14′ which move jaw elements 11, 11′ to grasp the respective bars 8, 8′. Thus, extension of the connecting rods for cylinders 14, 14' pivots movable mechanical hand portions 12a, 12a' about its respective axle 13, 13', causing the jaw elements 11, 11' to move toward the respective fixed jaw element 10, 10', to firmly grip rods 8, 8' between the jaw elements. Cylinder 23 controls movement of mechanical hand 12' relative to mechanical hand 12. Thus, retraction of the connecting rod 23a of cylinder 23 draws mechanical hands 12, 12' closer together, and brings the ends of bars 8, 8' into abutting contact. Conversely, extension of the connecting rod moves hands 12, 12' apart to separate bars 8, 8'.

The action of hydraulic cylinder 23 can be effected in various ways, depending upon the type of welding to be done.

With the present apparatus, it is possible to weld frontally (butt welding) or to weld by sparkling (arc welding). For electric resistance butt welding, distributors 31 and 32 are continually closed, and cylinder 23 is activated by distributors 33, 34, 35 and 36. Extension of the connecting rod 23a of cylinder 23, which places jaws 10, 11 and 10', 11' at their starting positions, is achieved by opening distributors 34 and 35. Opening of distributors 33 and 36 retracts the connecting rod 23a. Closing all the distributors immobilizes cylinder 23. Overflow or safety valve 37 protects cylinder 23 from further pressure should distributor 34 fail to open.

To achieve electric resistance butt welding by "sparkling" (arcing), regulation of the activation of cylinder 23 may be achieved manually or automatically.

For welding by manual regulation, distributor 32 is maintained closed in the start position. Distributors 31, 33, 34, 35 and 36 are also closed, while valve 38 for fine regulation (adjustment) is opened slightly. Connecting rod 23a is extended slightly and placed in the front limit position. When distributors 33 and 36 are opened, connecting rod 23a retracts a short, predetermined length, correspondng to moving the mechanical hands 12, 12' closer, as well as moving closer jaw elements 10, 11 and 10', 11'.

The foregoing movement can also be achieved by opening distributors 33 and 31. Then, it is possible to regulate conveniently the speed and movement of connecting rod 23a with valve 38. Afterwards, cylinders 14, 14' are activated to tightly grasp bars 8, 8' and when the bars touch, welding is initiated. When distributors 33 and 31 are closed, and distributors 34 and 35 are opened, connecting rod 23a again returns to its front limit position so that bars 8 and 8' are separated a certain distance. This distance is equal to the distance achieved after the opening of distributors 33 and 36 to retract connecting rod 23a. Then distributors 34 and 35 are closed, the electricity turned on, and distributors 31 and 33 are opened to begin the arcing between bars 8, 8'. Control of the connecting rod 23a to move bars 8, 8' closer is achieved with valve 38 for fine regulation or adjustment. At the end of the arcing phase, the electricity is turned off, and distributor 36 is opened to move connecting rod 23a in the same direction, resulting in a compression of bars 8, 8'.

Figure 4:
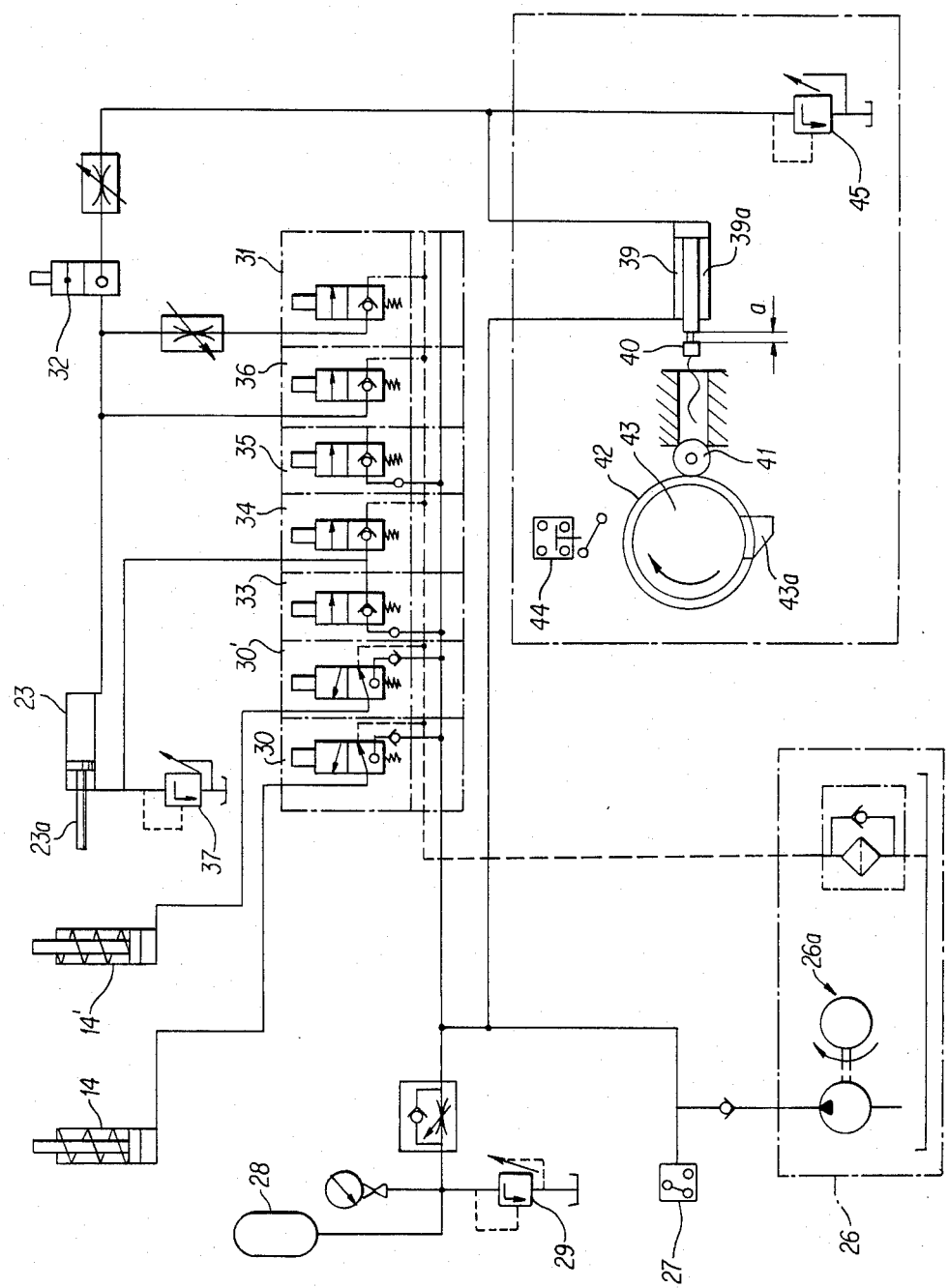
FIG. 4 is a schematic of the hydraulic system of the apparatus.

To achieve welding by automatic regulation of cylinder 23, distributor 31 is continually closed. The start position of connecting rod 23a and of distributors 33, 34, 35 and 36 are the same as in welding by manual regulation. Distributor 32 is also closed while connecting rod 39a of cylinder 39 is in its limit position (completely retracted). A clearance a is provided between connecting rod 39a and adjustable bolt 40 (FIG. 4). By turning the bolt 40 in slider-with-wheel 41, this clearance can be adjusted. When distributors 32 and 33 are opened, connecting rod 39a moves, as well as connecting rod 23a, a distance a. In this position, bars 8, 8' are securely grasped by the jaw elements by extension of cylinders 14, 14'. Welding commences the moment bars 8, 8' touch.

Now, distributors 32 and 33 are closed, and distributors 34 and 35 are opened. Connecting rod 39a remains in the same position while connecting rod 23a retracts to its initial position. At this time, bars 8 and 8' are separated a distance a. Afterwards, the electric current is turned on and, again, distributors 34 and 35 are closed and distributors 32 and 33 are opened. At the same time, the drive rotating cam plate 42 is turned on, to start the arcing phase with automatic regulation. During cam plate rotation, the shape of lobe 43a determines movement of connecting rod 39a and, because of it, the movement of connecting rod 23a.

The arcing phase lasts until lobe 43a depresses circuit breaker 44 to break the welding current and, at the same time, to open distributor 36. Connecting rod 23a continues to move quickly in the same direction, to press together the ends of bars 8, 8' to complete butt welding of the bars.

It is not intended to limit the apparatus of the present invention to the particular embodiment described herein, and various modifications may be made, including but not limited to changes in dimensions, shape and materials, without departing from the scope and spirit of the invention as set forth in the following claims.

I claim:

1. A welding apparatus having a hydraulically-actuated, controllable mechanical handling assembly for holding and positioning elements to be joined by welding, a movable and adjustable support assembly for supporting the handling assembly relative to the elements to be joined, an electric system for providing electric welding current to the handling assembly, and a hydraulic system including a hydraulic drive providing pressurized fluid for the apparatus, control means regulating flow of the pressurized fluid to operate the mechanical handling assembly, and coupling means fluidly interconnecting the hydraulic drive, the handling assembly and the control means, the mechanical handling assembly comprising:

a first mechanical hand having a tubular body portion coupled to a first hydraulic actuator;

a second mechanical hand having an elongated portion slidably disposed within the tubular body portion of the first mechanical hand;

connecting means connecting the elongated portion of the second mechanical hand to the first hydraulic actuator, said actuator operable to reciprocate the second mechanical hand relative to the first mechanical hand;

adjustment means cooperating with the connecting means to adjust the limits of reciprocal movement of the second mechanical hand relative to the first mechanical hand;

each of said first and said second mechanical hands having a first gripping member pivotally movable relative to a second gripping member; and a second hydraulic actuator associated with the gripping members of each mechanical hand and operable to cause each pair of gripping members to hold the element to be joined by welding;

said support system comprising:

a support post mounted on a movable base;

a tubular housing coaxial with and rotatable relative to the support post;

a hollow holder horizontally fixed to and rotatable with the tubular housing; and an elongated support member disposed within the hollow holder and adjustably movable relative to the holder, one end of the support member adapted to support the mechanical handling assembly, and the other end having a counterbalancing weight; and said electric system having a pair of cables, one end of each cable connected to one end of the first and the second mechanical hands, each cable having means for the flow of a fluid therethrough to cool the cable and the mechanical hand;

said control means operable to effect gripping of the elements to be joined by said first and said second mechanical hands and to place the elements in position for welding.

2. A welding apparatus according to claim 1, wherein:

the tubular body portion of the first mechanical hand is coupled to the housing of the first hydraulic actuator;

the connecting means includes a coupling interconnecting the elongated portion of the second mechanical hand and the connecting rod of the first hydraulic actuator; and the adjustment means includes a threaded fastener threadedly attaching the elongated portion of the second mechanical hand to the coupling, rotation of the fastener achieving adjustment of the limits of movement of the second mechanical hand relative to the first mechanical hand upon operation of the first hydraulic actuator.

3. A welding apparatus according to claim 1, wherein the elongated support member is provided with a pulley-and-cable arrangement to suspend the mechanical handling assembly from the support member.

4. A welding apparatus according to claim 1, wherein the gripping members of each mechanical hand are adjustable to accommodate different sizes of elements to be joined by welding.

5. A welding apparatus according to claim 1, wherein the control means in the hydraulic system includes means operable to control operation of the first hydraulic actuator and the welding electric current to achieve automatic regulation of the welding, said means comprising:

a first cam plate;

a second cam plate coaxially disposed relative to the first cam plate, the second cam plate having a peripheral protrusion thereon;

means for rotating both the first and second cam plates;

a circuit breaker forming a part of the electric system and disposed adjacent the second cam plate to be contacted by the peripheral protrusion to control welding electric current;

a hydraulic cylinder in fluid communication with the first hydraulic actuator and disposed adjacent the first cam plate;

means on the connecting rod of the hydraulic cylinder and longitudinally adjustable relative to the end of the connecting rod; and biased means supported on the connecting rod of the hydraulic cylinder and bearing against the peripheral surface of the first cam plate, the contour of said peripheral surface controlling movement of said connecting rod and hence the operation of the first hydraulic actuator and movement of the mechanical hands holding the elements to be joined by welding.

6. A welding apparatus according to claim 1, wherein one of the elements to be joined by welding has a portion embedded and inaccessible to the mechanical handling assembly, and the second mechanical hand is adapted to hold the free end portion of said embedded element.

* * * * *